US006888895B2

(12) United States Patent
Gentric et al.

(10) Patent No.: US 6,888,895 B2
(45) Date of Patent: May 3, 2005

(54) METHOD AND DEVICE FOR ENCODING MPEG-4 VIDEO DATA

(75) Inventors: Philippe Gentric, Issy les Moulineaux (FR); Beatrice Nezot, Paris (FR); Yves Ramanzin, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 578 days.

(21) Appl. No.: 10/084,841

(22) Filed: Feb. 26, 2002

(65) Prior Publication Data

US 2002/0118749 A1 Aug. 29, 2002

(30) Foreign Application Priority Data

Feb. 27, 2001 (EP) .......................................... 01400504

(51) Int. Cl.[7] ................................................ H04N 7/12
(52) U.S. Cl. ............................ 375/240.27; 375/240.26
(58) Field of Search ...................... 375/240.27, 240.28, 375/240.26; 348/425.1, 425.2, 425.3, 425.4; 370/472–473, 476; 714/746

(56) References Cited

U.S. PATENT DOCUMENTS

| 6,754,277 | B1 | * | 6/2004 | Heinzelman et al. | .. 375/240.27 |
| 6,768,775 | B1 | * | 7/2004 | Wen et al. | ............. 375/240.23 |
| 2001/0005385 | A1 | * | 6/2001 | Ichiguchi et al. | ........... 370/535 |
| 2002/0018565 | A1 | * | 2/2002 | Luttrell et al. | .............. 380/217 |

OTHER PUBLICATIONS

Brailean, J., "Wireless Multimedia Utilizing MPEG–4 Error Resilient Tools", IEEE Wireless Communications and Networking Conference, vol. 1, pp. 104–108, Sep. 1999.*

Miki et al, "Error Resilience Features of MPEG–4 Audio–Visual Coding and Their Application To 3G Multimedia Terminals", 5th International Conference on Signal Processing Proceedings, vol. 1, pp. 40–43, Aug. 2000.*

Talluri, R., "Error–Resilient Video Coding in the ISO MPEG–4 Standard", IEEE Communications Magazine, vol. 36, Issue: 6, pp. 112–119, Jun. 1998.*

Heinzelman et al, "Unequal Error Protection of MPEG–4 Compress Video", International Conference on Image Processing, vol. 2, pp. 530–534, Oct. 1999.*

Wang et al, "Error Resilent Video Coding Techniques", IEEE Signal Processing Magazine, vol. 17, issue: 4, pp. 61–82, Jul. 200.*

* cited by examiner

Primary Examiner—Vu Le

(57) ABSTRACT

The invention relates to a method and a device for encoding video data consisting of one or several bitstreams according to the MPEG-4 standard. In order to avoid any problem when mapping the video elements into the system elements, a specific alignment/fragmentation mechanism is chosen. According to this mechanism, when said video bitstreams are encoded using the syntax mode corresponding to the fragmentation of the Video Object Planes (VOPs) contained in said video data into Video Packets (VPs)and of Video Packets into Data Partitions (DPs), a Video Data Partition is mapped into one or more SL packets (SL1, SL2, SL3, SL4, . . .), the first Video Data Partition (DP1) start is always mapped to an SL packet start, and the last SL packet transporting the first Data Partition includes the separation marker and up to 7 subsequent bits of the second Data Partition (DP2) in order to obtain byte alignment, the next SL packet starting on the next bit of the second Data Partition.

3 Claims, 2 Drawing Sheets

METHOD AND DEVICE FOR ENCODING MPEG-4 VIDEO DATA

Figure 1:
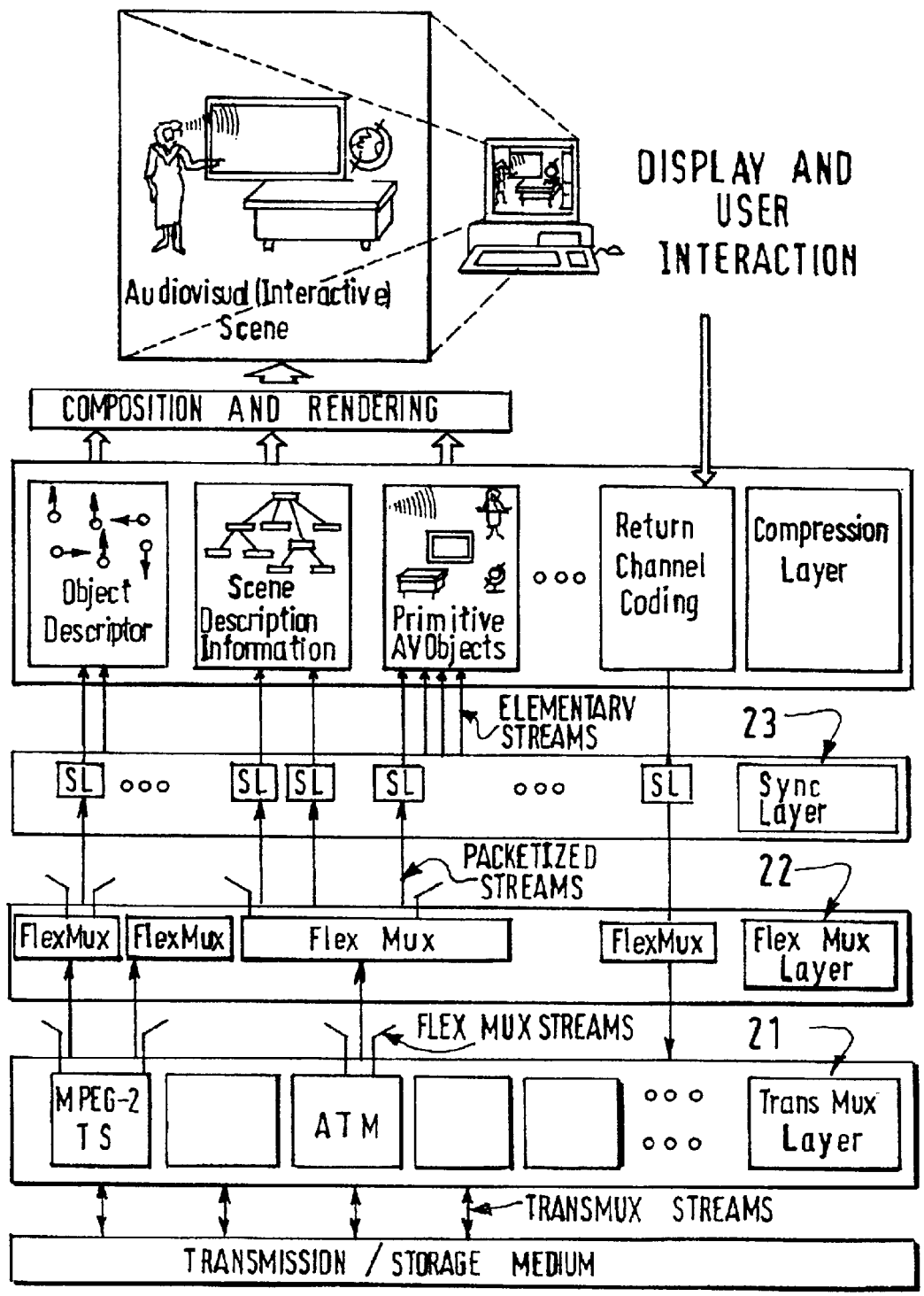

The present invention relates to a method for encoding video data consisting of one or several bitstreams according to the MPEG-4 standard. It also relates to a corresponding encoding device and to a coded MPEG-4 signal consisting of at least a video bitstream obtained at the output of such an encoding device.

The transmission of audio-visual data on lossy networks, such as the Internet or UMTS radio channels, requires the use of coding techniques that are both efficient in their use of bits and robust against transmission errors. The MPEG-4 standard, which has been designed in this context and provides standardized ways to represent audio-visual objects (AVOs) of natural or synthetic origin, exploits both the temporal and spatial redundancies found in natural and synthetic video sequences. To that purpose, for the three types of Video Object Planes (VOPs) present in the video stream (intra VOPs, or I VOPs; predicted VOPs, or P VOPs; bidirectional VOPs, or B VOPs), specific coding techniques are used. These coding techniques, which reduce the bandwidth requirements by removing the redundancy in the video signal, become, when said signal is partitioned into packets in the transport layer, quite sensitive to bit errors and transport-layer packet losses (for example, a single bit error may make the decoding of information impossible, or, owing to a transport-layer packet loss, the predictively-coded motion information in the next packets may become undecodable). Moreover, due to the predictive nature of the encoder, an error which occurs in an I or P VOP tends to propagate to the following P and surrounding B VOPs.

Error resilience is then one of the numerous options offered by the MPEG-4 video standard in order to solve the previously indicated drawbacks: it provides a set of tools which allows to hierarchically sort out the encoded data according to their sensitivity (this error resilient mode includes inter alia a functionality improving the ability of the decoder to localize an error: it is based on data partitioning, achieved by separating the motion and macroblock header information and the texture information, which allows, if the texture information is lost, to use the motion information to conceal such an error by means of a motion compensation of the previously decoded VOP). In order to take advantage of this feature, the transport layer must take into account the hierarchy information provided by the video layer.

The MPEG-4 video bitstreams are classically composed of a number of elements such as: Video Objects (VOs), Video Object Layers (VOLs), Video Object Planes, Group of VOPs (GOVs), Video Packets (VPs), Video Data Partitions (VDPs), etc. . . , and MPEG-4 system manipulates entities such as: DecoderSpecificInfo, Access Units (AUs), SL packets. For this, to work properly, how to map the video elements into the system elements is of key importance. In particular, the mapping of Video Data Partitions to system is described here. Video Data Partitions correspond to fragments of Video Packets, in a specific video bitstream syntax mode that enables them for error resilience purposes; specifically, there are two video Data Partitions for each Video Packet. A drawback of the Data Partition syntax is however that it is not byte aligned, i.e. the boundary between the first and second Data Partitions of a Video Packet is not byte aligned: it does not start on a bit multiple of 8. This situation is sub-optimal for an efficient machine implementation and may lead to problems when considering network transport, since network protocols transport bytes (i.e. slices of eight bits).

It is therefore a first object of the invention to propose a method avoiding this drawback.

To this end, the invention relates to a method for encoding video data consisting of one or several bitstreams according to the MPEG-4 standard, in which a specific alignment/fragmentation mechanism is chosen, according to which, when said video bitstreams are encoded using the syntax mode corresponding to the fragmentation of the Video Object Planes (VOPs) contained in said video data into Video Packets (VPs) and of Video Packets into Data Partitions (DPs), a Video Data Partition is mapped into one or more SL packets, the first Video Data Partition start is always mapped to an SL packet start even if a large Video Data Partition is splitted across several SL packets, and the last SL packet transporting the first Data Partition includes the separation marker (DC marker or Motion Marker depending on VOP type) and up to 7 subsequent bits of the second Data Partition in order to obtain byte alignment, the next SL packet starting on the next bit of the second Data Partition.

It is another object of the invention to propose a corresponding encoding device.

To this end, the invention relates to a device for encoding video data consisting of one or several bitstreams according to the MPEG-4 standard, said device comprising a specific alignment/fragmentation mechanism, according to which, when said video bitstreams are encoded using the syntax mode corresponding to the fragmentation of the Video Object Planes (VOPs) contained in said video data into Video Packets (VPs) and of Video Packets into Data Partitions (DPs), a Video Data Partition is mapped into one or more Sync Layer packets (SL packets), the first Video Data Partition start is always mapped to an SL packet start even if a large Video Data Partition is splitted across several SL packets, and the last SL packet transporting the first Data Partition includes the separation marker and up to 7 subsequent bits of the second Data Partition in order to obtain byte alignment, the next SL packet starting on the next bit of the second Data Partition.

The invention also relates to a coded MPEG-4 signal consisting of at least a video bitstream obtained at the output of an encoding device in which a specific alignment/fragmentation mechanism is chosen, according to which, when said video bitstream(s) is (are) encoded using the syntax mode corresponding to the fragmentation of the Video Object Planes (VOPs) contained in said video data into Video Packets (VPs) and of Video Packets into Data Partitions (DPs), a Video Data Partition is mapped into one or more Sync Layer packets (SL packets), the first Video Data Partition start is always mapped to an SL packet start even if a large Video Data Partition is splitted across several SL packets, and the last SL packet transporting the first Data Partition includes the separation marker and up to 7 subsequent bits of the second Data Partition in order to obtain byte alignment, the next SL packet starting on the next bit of the second Data Partition.

Figure 2:
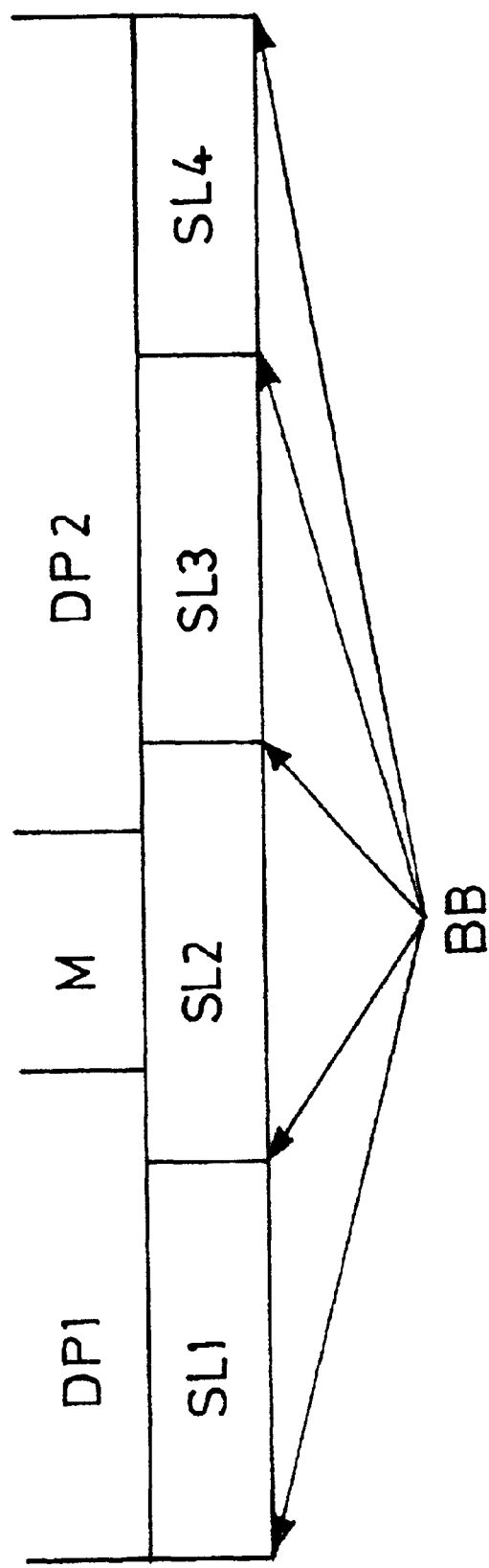

The present invention will now be described, by way of example, with reference to the accompanying drawings in which:

FIG. 1 gives the main processing layers of a multimedia terminal;

FIG. 2 illustrates the alignment/fragmentation mechanism according to the invention.

As said above, the MPEG-4 standard provides standardized ways to represent AVOs of natural or synthetic origin, to compose them together to create compound AVOs that form audio-visual scenes (an audio-visual scene is generally composed of several AVOs, organized in a hierarchical fashion), to multiplex and synchronize the data associated with AVOs, and to interact with the audio-visual scenes generated or reconstructed at the receiver side. The main processing stages of a multimedia audiovisual terminal allowing to render and display such an audiovisual scene is illustrated in FIG.1, where the terminal is a multi-layer structure consisting of the three following layers: a TransMux layer 21, a FlexMux layer 22 and an Access Unit layer 23.

The TransMux layer 21 consists of a protection sublayer and a multiplexing sublayer (although it may not be possible to separately identify these sublayers in some TransMux instances, the protection sublayer has a specific interest for providing error protection and error detection tools suitable for the given network or storage medium). This layer 21, not defined in the context of MPEG-4, is in fact an interface to the network or the storage medium and allows to offer transport services matching the requested Quality of Service (QoS). At its output, FlexMux streams are available, i.e. a sequence of FlexMux Packets (small data entities consisting of a header and a payload).

The FlexMux layer 22, completely specified by MPEG-4, consists of a flexible tool for interleaving data (one or more Elementary Streams into one FlexMux stram) and allows to identify the different channels for the data that have been multiplexed. At the output of said layer 22, SL-Packetized Streams are available, i.e. a sequence of SL-Packets that encapsulate one elementary stream (SL-Packet, or sync layer Packet= the smallest data entity managed by the next layer 23, or Sync layer, said entity comprising a configurable header and a payload itself consisting of a complete or partial access unit).

The layer 23, or Sync Layer, is provided to adapt elementary stream data for communication. The elementary streams are conveyed as SL-packetized streams, and this packetized representation additionally provides timing and synchronization information, as well as fragmentation and random access information. This layer 23 is followed by the compression layer 24 which recovers data from its encoded format and allows to perform the necessary operations to decode the encoded signals and reconstruct the original information. This decoded information is then processed (composition, rendering) in view of its presentation (in order to be displayed) or of some user interactions.

According to the invention, illustrated by the alignment/fragmentation mechanism of FIG. 2, the following solution is then proposed. When video bitstreams are encoded using the syntax mode corresponding to the fragmentation of VOPs into Video Packets, and of these Video Packets into Data Partitions (DPI, DP2), a Video Data Partition should be mapped into one or more SL packets (SLI, SL2, SL3, SL4, etc) which are byte aligned (there is a distance of 8 bits or a multiple of 8 bits between the respective first bits of these SL packets, i.e. between the byte boundaries BB of the SL packets). Specifically, it is allowed to split a large Video Data Partition across several SL packets, but the first Video Data Partition DP1 start must always be mapped to an SL packet start.

Furthermore, since the second Data Partition is useless if the first one is lost but a decoder however needs a marker M to safely identify the end of the first Data Partition DP1, the following alignment rule should be used: the last SL packet transporting the first Data Partition must include the separation marker M (DC marker or Motion Marker, depending on VOP type) and up to 7 subsequent bits of the second Data Partition in order to obtain byte alignment. The next SL packet starts on the next bit of the second Data Partition. The specific alignment/fragmentation thus described allows to map the video elements into the system elements and to avoid in this case any file formation interchange problem or any network problem.

What is claimed is:

1. A method for encoding video data consisting of one or several bitstreams according to the MPEG-4 standard, characterized in that a specific alignment/fragmentation mechanism is chosen, according to which, when said video bitstreams are encoded using the syntax mode corresponding to a fragmentation of the Video Object Planes (VOPs) contained in said video data into Video Packets (VPs) and of Video Packets into Data Partitions (DPs), a Video Data Partition is mapped into one or more Sync Layer packets (SL packets), the first Video Data Partition start is always mapped to an SL packet start even if a large Video Data Partition is splitted across several SL packets, and the last SL packet transporting the first Data Partition includes the separation marker and up to 7 subsequent bits of the second Data Partition in order to obtain byte alignment, the next SL packet starting on the next bit of the second Data Partition.

2. A device for encoding video data consisting of one or several bitstreams according to the MPEG-4 standard, said device comprising a specific alignment/fragmentation mechanism, according to which, when said video bitstreams are encoded using the syntax mode corresponding to a fragmentation of the Video Object Planes (VOPs) contained in said video data into Video Packets (VPs) and of Video Packets into Data Partitions (DPs), a Video Data Partition is mapped into one or more Sync Layer packets (SL packets), the first Video Data Partition start is always mapped to an SL packet start even if a large Video Data Partition is splitted across several SL packets, and the last SL packet transporting the first Data Partition includes the separation marker and up to 7 subsequent bits of the second Data Partition in order to obtain byte alignment, the next SL packet starting on the next bit of the second Data Partition.

3. A coded MPEG-4 signal consisting of at least a video bitstream obtained at the output of an encoding device in which a specific alignment/fragmentation mechanism is chosen, according to which, when said video bitstream(s) is (are) encoded using the syntax mode corresponding to a fragmentation of the Video Object Planes (VOPs) contained in said video data into Video Packets (VPs) and of Video Packets into Data Partitions (DPs), a Video Data Partition is mapped into one or more Sync Layer packets (SL packets), the first Video Data Partition start is always mapped to an SL packet start even if a large Video Data Partition is splitted across several SL packets, and the last SL packet transporting the first Data Partition includes the separation marker and up to 7 subsequent bits of the second Data Partition in order to obtain byte alignment, the next SL packet starting on the next bit of the second Data Partition.

* * * * *